United States Patent [19]

Eberlin et al.

[11] 4,184,354
[45] Jan. 22, 1980

[54] ARRANGEMENT FOR THE TRANSPORTATION AND STORAGE OF HEAVY GOODS OF BULKY DIMENSIONS

[76] Inventors: Helmut Eberlin, Blumenweg 1, D-7889 Wyhlen, Fed. Rep. of Germany; Karl R. Halada, Fichtenweg 752, CH-5102 Rupperswil, Switzerland; Peter Kaufmann, D-789 Waldshut, Fed. Rep. of Germany

[21] Appl. No.: 955,750

[22] Filed: Oct. 30, 1978

[51] Int. Cl.² ............................................. B21B 1/00
[52] U.S. Cl. ..................................................... 72/250
[58] Field of Search ............................... 72/250–252, 72/199, 203, 234, 226, 200

[56] References Cited

U.S. PATENT DOCUMENTS

| | | | |
|---|---|---|---|
| 2,162,407 | 6/1939 | Manion | 72/234 X |
| 3,961,712 | 6/1976 | Bartley | 212/5 |
| 4,077,245 | 3/1978 | Bauer et al. | 72/250 |

*Primary Examiner*—Milton S. Mehr
*Attorney, Agent, or Firm*—Abraham A. Saffitz

[57] ABSTRACT

This invention is directed to a system for the transportation and storage of heavy goods of bulky dimensions and, in particular, coiled metal trackway which, during manufacture, is formed in rolls and requires movement between fabricating stations and intermediate storage stations under conditions where high space storage is the preferred arrangement. High space storage areas having narrow sides but not directly interconnected and in abutting arrangement are located in equi-axial fashion along a central longitudinal transportation pathway having low level workshops adjoining this pathway. Also adjoining this central transportation pathway are manufacturing stations which are disposed in transverse relation to the central pathway. Overhead transportation trucks transfer bundles of metal sheets from high space storage to fabricating stations, including rolling mills and cutting machines, for forming the sheets and cutting into the final product in the form of bundles. Between work stations (rolling mills and cutting machines) trucks carry the work and conveying means cooperate with additional trucks to place the product in high space storage.

5 Claims, 4 Drawing Figures

ARRANGEMENT FOR THE TRANSPORTATION AND STORAGE OF HEAVY GOODS OF BULKY DIMENSIONS

CROSS REFERENCE TO RELATED APPLICATION

Applicants make reference to Swiss Patent Application No. 11,256/76, filed in Switzerland Sept. 1, 1976, which has now matured into Swiss Pat. No. 605,345.

The present invention relates to a system for the transportation and storage of heavy goods of bulky dimensions, especially of tracks made of metal and rolled up in rolls, along a transportation pathway between high storage areas and along positions of fabricaton and processing which form a production line served by the transportation and storage arrangements.

DESCRIPTION OF THE PRIOR ART

The applicant has already proposed an arrangement which contains an automatic and remote controlled transportation system for serving high space storages with a cold rolling mill for thin sheets. At the same time, the entire transportation is accomplished in a plane lying below and above the plane of the production line, whereby the transported goods are intermediately stored at the beginning and at the end of the processing sectors in the high space storage.

OBJECTS OF THE INVENTION

An object of the present invention is to provide a considerable improvement and simplification of the known arrangement, whereby at the same time a remarkable increase of the transport capacity is achieved. A further object is to provide, in the present invention, an improved transportation high storage system for a metal fabricating plant which is characterized according to the invention by the fact that it has several high space storages running equiaxially and is provided abutting with their narrow sides and with low workshops laterally adjoining the former, in which there are processing positions for the goods to be transported and stored disposed transversely to the direction of transportation. These processing stations are connected by means of cross transportation elements and are also connected with the longitudinal transportation arrangements serving for storage.

SUMMARY OF THE INVENTION

Since the capacity of the storage machines and of the high space storages is overtaxed in the fabrication and storage of bulky coils of rolled and cut metal products and, in particular, at the fabricating stations where the broad belts are formed by the rolling mill machines and at the cutting stations where narrower belts are formed by longitudinally cutting the broad belts from the rolling mills, there is a real need of the simplified system to provide storage spaces which are utilized to a high degree in the separate fabricating areas and which can also utilize the high space in each of these separate areas, one of the high space storge areas being for the rolling mill production of broad belt coils and the other for the cutting station production of narrower belt coils. The one high storage space is for broad belts wound on coils, the other high storage space is for narrow belts which are deposited with their coils on forklifts or on racks, whereby only these storage boards or racks are put in or taken out of the storage. With the provisions for these separate high storage spaces, one will advantageously: optimize the problems of storage clearances between broad bundles and one will avoid metal racks or metal sheets to be stored and also the necessity of providing both the storage machine as well as the storage shelves with special receivers for broad bundles or coils as well as stacks or storage boards. By using a single storage system to carry out a double function makes the mechanical reliability of the system considerably more difficult and calls for a considerable additional expenditure in apparatuses and controls. This added expense is avoided by the invention by the separation of the intermediate storage whereby, an overloading of the storage machines may be avoided.

Effectively in accordance with the invention, a workshop containing a rolling mill will be connected to the first high space storage, whereby between the high space storage and the workshop there are ground floor passages served by cross transportation elements.

According to a preferred embodiment, the cross transportation elements are developed as carriages for bundles and are equipped with lifting arrangements which take over the transported and to be processed goods directly from the assigned storage machine shifted in transverse direction in relation to the high space storage and feed it directly to the rolling mill.

BRIEF DESCRIPTION OF THE DRAWINGS

In the attached drawing, a preferred embodiment of the object of the invention has been shown.

Figure 1:
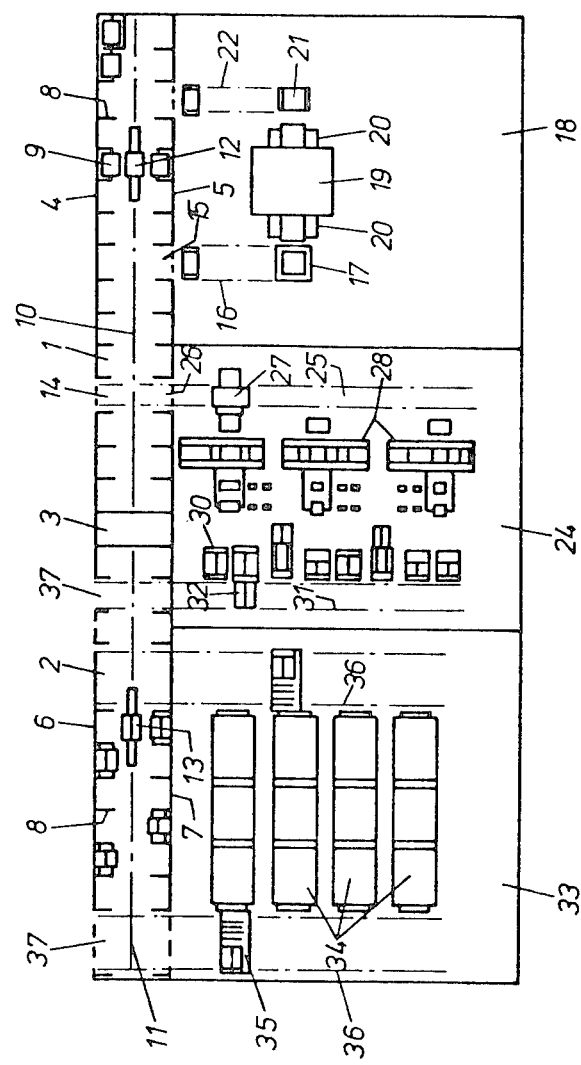
FIG. 1 shows a schematic development of the arrangement in outline.
Figure 2:
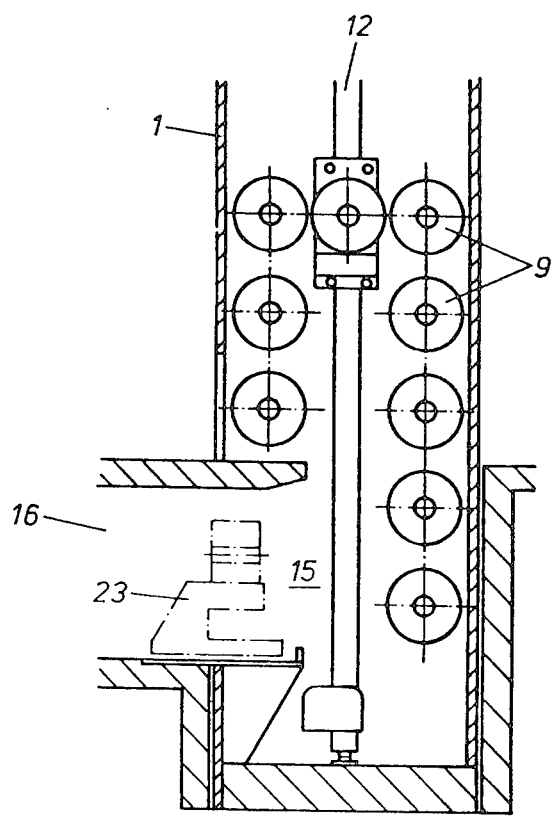
FIG. 2 shows a detail in vertical cut and drawn in an enlarged scale.

The preferred system for transportation and storage of heavy goods in accordance with the invention has two high space storges 1 and 2, which are erected equiaxially on separate foundations and are disposed so as to abut with their narrow sides in such a way that a passage 3 transverse to the longitudinal pathway remains between the two high space storages 1 and 2. The storages 1 and 2 are provided along their longitudinal walls 4, 5, 6 and 7 with supports 8. In the high space storage 1, the walls provide enclosed spaces for the reception of bundles of metal sheets 9 and in the high space storage 2 the walls provide enclosed spaces for the storages for annealing frames or storage panels. Between the supports 8 which are illustrated to reinforce the high space storage areas 1 and 2, there is provided a pathway 10 leading to the storage area 1 and a pathway 11 leading to the storage area 2, these two pathways arranged to permit the movement of a storage machine 13 in the storage area 2 and of a storage machine 12 in the storage area 1. The high space storage area 1 has an inlet 14 through which the bundles of sheet metal 9 are delivered and taken over by the storage machine 12. On the opposite side of the storage path 10, there is a ground floor exit 15 which leads into a subterranean passage 16. The subterranean passage 16 extends transversely in relation to the high space storage area 1 and leads to an elevator 17 for lifting bundles into a workshop 18 which is attached laterally to the high space storage area 1 and serves for the input to a rolling mill 19 with the pertinent apparatus 20 for turning, opening and winding of the bundles. On the other side of the rolling mill 19, there is an additional elevator 21 for bundles to the subterranean passage 22 which leads back into the high space storage area 1. In the subterranean passages 16 and 22, transportation trucks 23 transport these bundles and these trucks are equipped with a lifting apparatus which, under certain circumstances, makes it possible that one might omit the elevators 17 and 21 for bundles because these transportation trucks 23 take over the bundles 9 from the storage machine 12 and feed them directly in to the feeding means 20 of the rolling mill 19.

Figure 3:
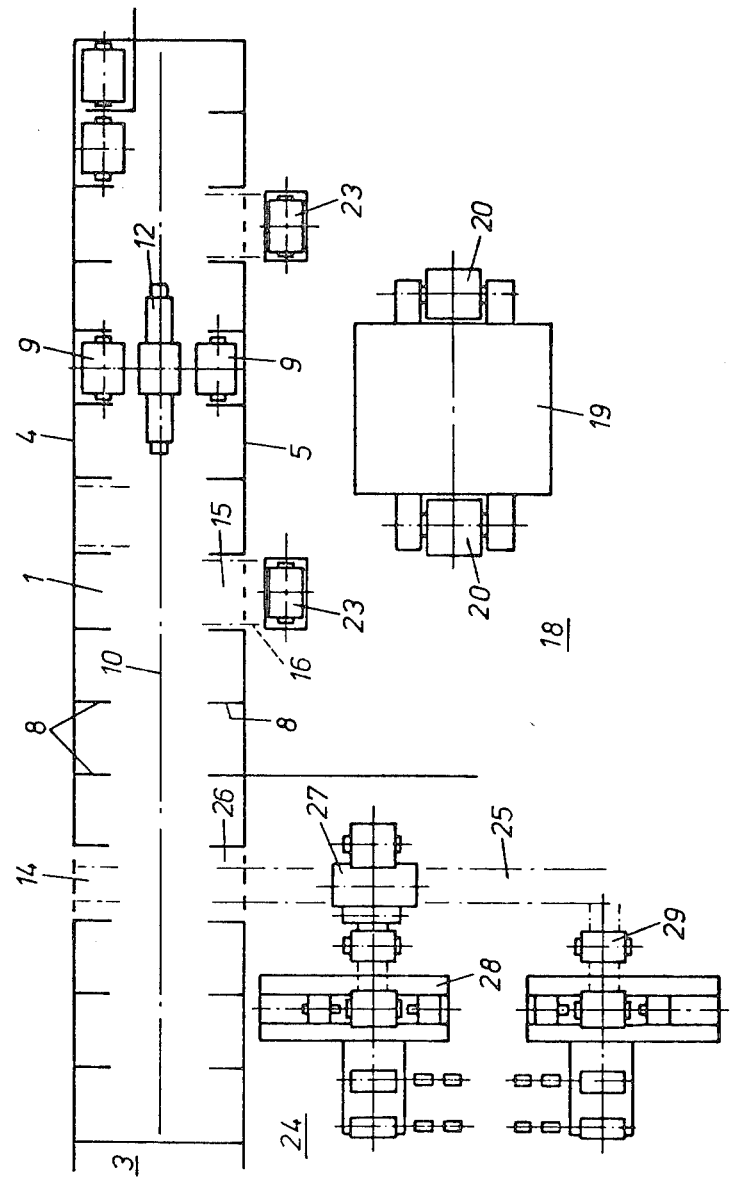
FIG. 3 is an enlarged presentation of a part of the arrangement likewise in outline.

Adjoining the workshop 18 there is provided shop 24 which is connected by way of an overhead transportation truck 25 with the high space storage 1. The transportation pathway 25, the inlet 26 of which lies directly opposite the inlet 14 of the high space storage 1, is travelled by an overhead truck 27 for bundles. This pathway permits the location of a roller cutting shop disposed in the adjusting shop 24. The layout of the adjusting shop 24 is shown in more detail in FIG. 3 and comprises a pay off reel 29 for bundles and several roller cutting machines 28. The overhead truck 27 is for bundles and moves in a transverse direction and effectively also has a turning mechanism for turning the bundles to be transported. Further stations 30 are shown in FIG. 3 and these stations serve for storages where the longitudinal cut bundles are stored in frames or storage boards. These stations extend 30 parallel to the roller cutting machines 28 and these stations 30 are disposed transversely in relation to the high space storage area 1 and are connected with the storage 2 by means of a conveying path 31. On the conveying path 31 there is provided an additional truck 32 which moves along said path and, which may be served directly by the storage machine 13. Opposite this conveying path 31, there is provided an exit 37 for hard annealed bundles in the high space storage 2.

Figure 4:
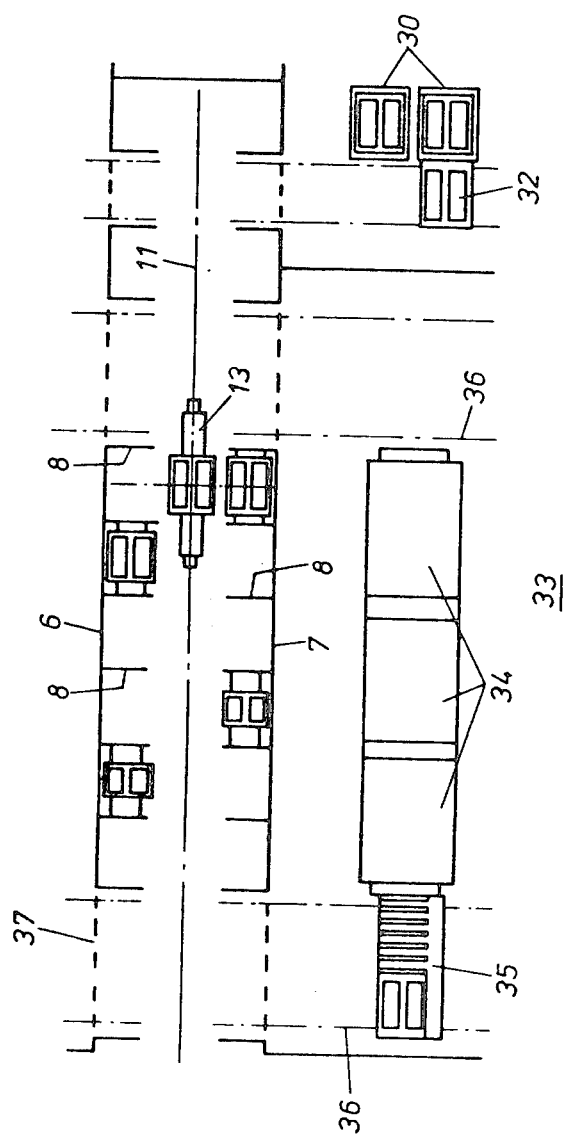
FIG. 4 shows a part of the arrangement at an enlarged presentation.

An additional shop 33 is shown in FIG. 4 and is connected to the adjusting shop 24 in the longitudinal direction of the high space areas storage 1 and 2, in which a plurality of shop annealing furnaces 34 are disposed in parallel rows. The annealing furnaces 34, in turn, are served by overhead trucks 35 which move on conveying tracks 36 which are connected with the storage machine 13. The soft annealed strips are transported away out of the high space storage 2 through an exit 37'. In the case of the arrangement described, either the bundles formed in the workshop from hard annealed strips are transported away through the exit 37 of the high space storage 2, or else, these bundles are treated further in the workshops 24 and 33 and finally the bundles formed from soft annealed strips, are removed through the exit 37'. The prerolled bundles reach the high space storage 1, they are transported by means of the storage machine 12 and are stored intermediately on supports 8. The subsequent processing takes place in the workshop 18 by means of the rolling mill 19. The feeding in step of processing in the roller mill takes place on the ground floor by means of the transportation truck 23 which takes over the bundles 9 directly from the storage machine 12 and feeds them to the subterranean passage to the elevator 21 for the bundles or lifts and thereby bring them directly to the apparatus 20. The processing is accomplished there and in the rolling mill 19, whereupon the bundles are returned through the subterranean passage 22, again to the high space storage 1. The subsequent division takes place in the roller cutting shop by means of roller cutting machines 28. The bundles consisting of hard strips are delivered through the exit 37. Whenever soft annealed strips are desired, then the furter processing takes place in the annealing furnaces 34 and the subsequent cooling in the high space storage 2. The bundles consisting of soft annealed strips are delivered to the exit 37'.

All the material is moved very quickly and precisely in longituidnal direction and perpendicularly by means of the storage machines 12 and 13, while the transportation in the transverse direction is accomplished by means of trucks for bundles which communicate between the rolling shop 18 and the high space storage 1 on the ground floor and between the shops 24 or 33 and the high space storage 1 or 2 overhead. The solution described makes an optimum division of work of the transportation means used possible, which are structured in an uncomplicated way and are made technically with little expenditure and may be used economically.

We claim:
1. A high space storage system for the transportation and storage of heavy manufactured goods of bulky dimensions particularly adapted for facilitating a production line for the manufacture and intermediate storage of bulky flat or rolled metal articles which are rolled in one manufacturing rolling mill area, cut by cutting machinery in an adjoining second manufacturing area and heat treated and annealed in a third manufacturing area adjacent said second area comprising:

a plurality of high space storage areas in alignment with each other and adjacent to a common outer wall of the first, second and third manufacturing areas to adapt said plurality of areas confined to said common wall to load and unload stock metal material from high storage to each of the three lower manufacturing areas in a transverse direction from said high space storage areas;

each of said plurality of high space storage areas including a common longitudinal trackway provided with high lift storage machinery which traverses said trackway to load and unload goods for each manufacturing area in a direction transverse to said manufacturing area;

side supports adapting each of said plurality of high space storage areas for the reception of goods in a size for delivery to said manufacturing areas and in a size for reception from the manufacturing areas to a subsequent stage of manufacture or for delivery as a finished product;

separate exit means from said high space storage areas adapting delivery to each of said manufacturing areas of metal goods unloaded from said storage areas; and a plurality of truck means adapting the removal of said metal goods from each manufacturing area, including trucks moving goods underground in a transverse direction from said high storage areas to the rolling mill for rolling operations, trucks moving overhead from said high storage areas to the cutting machinery in the second manufacturing area and trucks moving overhead in a transverse direction to deliver products from said high storage areas to the annealing apparatus in the third manufacturing area.

2. A high space storage system as claimed in claim 1 wherein said separate exit means to said first manufacturing area having the rolling mill includes an elevator which moves the goods underground through passages which are transverse to the high space storage area opposite said first manufacturing area.

3. A high space storage system as claimed in claim 2 wherein said separate exit is further provided with carriage means to carry the goods from said high space storage area and with auxiliary lifting and transporting means to place the goods delivered from said high lift machines and carry it to said carriage means for directly feeding said goods to the rolling mill in the first manufacturing area.

4. A high space storage system as claimed in claim 1 wherein said separate exit to said second manufacturing area is open in the transverse direction to separate one high storage area from the adjacent high storage area and said overhead truck means to the cutting machinery in the second storage area is adapted to move rolled and cut goods from the second manufacturing area out of delivery or to high space storage for the annealing operation in the third manufacturing area, the overhead truck movement cooperating with the high lift movement for loading and unloading the goods from storage.

5. A high space storage system as claimed in claim 4 wherein said plurality of high space storage areas constitutes two storage areas, a first high space storage area serving the first and second manufacturing areas for rolling and cutting respectively, and a second high space storage area serving the third manufacturing area for annealing with both annealed and unannealed products stored in the second high space storage area, the annealed products being transported on the overhead trucks moving in a transverse direction to deliver the heavy annealed goods to the high lift machines of said second high space storage area.

* * * * *